(No Model.)
C. C. DASHIELL.
CONDUIT FOR ELECTRICAL WIRES.
No. 411,427. Patented Sept. 24, 1889.
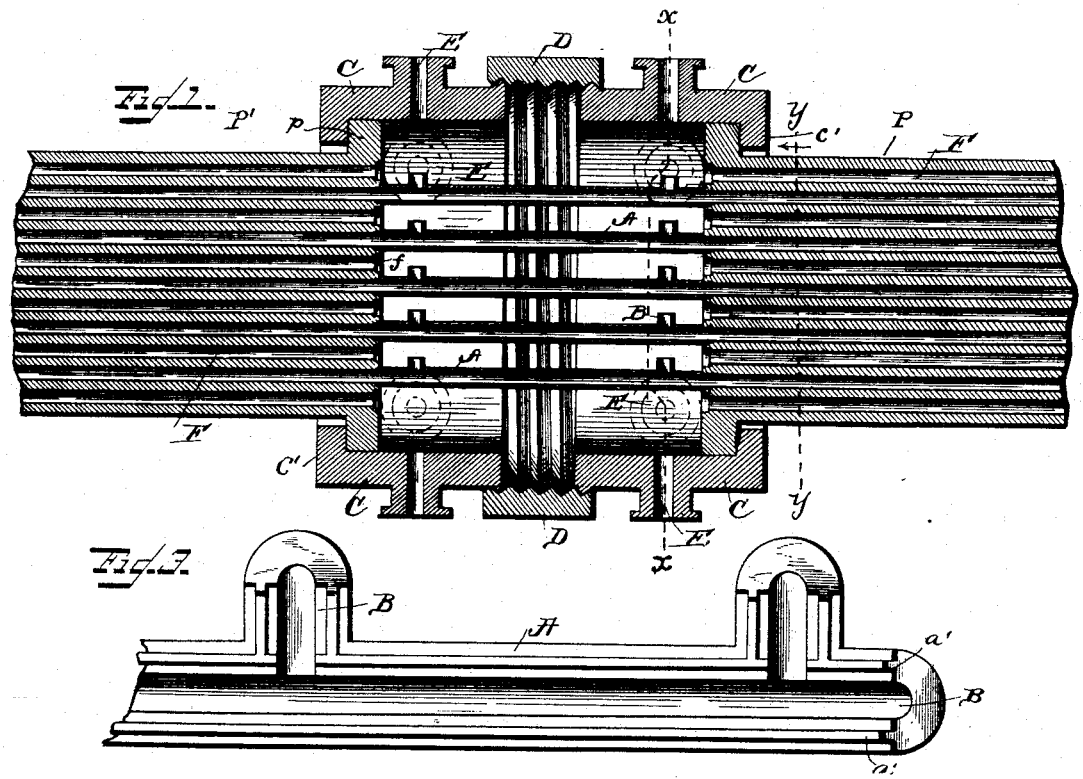
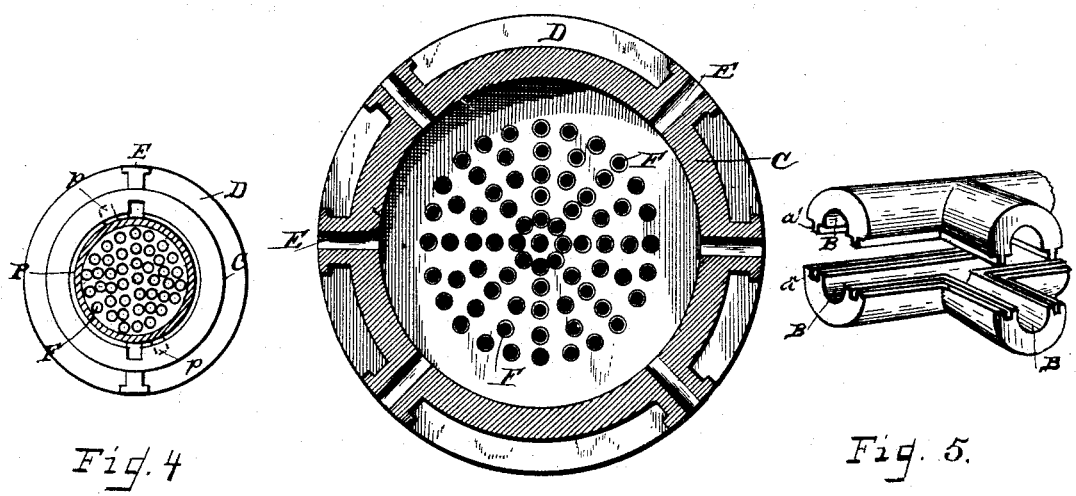
WITNESSES
F. L. Durand
Helen M. Robinson
INVENTOR
Chas. C. Dashiell

UNITED STATES PATENT OFFICE.

CHARLES C. DASHIELL, OF WASHINGTON, DISTRICT OF COLUMBIA.

CONDUIT FOR ELECTRICAL WIRES.

SPECIFICATION forming part of Letters Patent No. 411,427, dated September 24, 1889.

Application filed November 17, 1888. Serial No. 291,122. (No model.)

*To all whom it may concern:*

Be it known that I, CHARLES C. DASHIELL, a citizen of the United States, residing at Washington, in the District of Columbia, have invented a new and useful Conduit for Electrical Wires.

This conduit is capable of containing conductors in great numbers of currents of any needed tension or power, and embraces facilities for a ready, practical, and easy mode of connecting and continuing any desired current in a lateral direction to any point required, as its construction in detail permits the attachment of lateral wires, cables, or metallic tubes to any longitudinal wire, cable, or metallic tube contained in the main line at any point throughout its length, as well as the connecting of other systems of conduits or wires at will, of which the following is a specification.

My invention relates to improvements in conduits to contain electric cables, wires, or metallic tubes, the whole to be placed under the surface of the earth and to be used for the transmission of underground currents of electricity; and the objects of my improvement are, first, to provide a number of annular tubes massed in one body of a section or length of terra-cotta or burned or baked clay, and to secure a good air and water tight coupling connection of a number of such sections to form a continuous conduit of such length as may be desired; second, to afford facilities for placing electric conductors in this conduit fully insulated from each other's electrical influence as well as the adverse influence of storms, water, or air; third, to provide an easy way to connect the different parts of the conduit and the conductors therein, so as to make it continuous in its action, insulation, and safety from outside influences of an adverse character; fourth, to provide facilities for gaining access to any desired wire or conductor contained in the conduit at any point along its length or extent, as at A A B B, Fig. 1. I attain these objects by the mechanism illustrated in the accompanying drawings, in which—

Figure 1 is a central longitudinal section of the conduit. Fig. 2 is a vertical transverse section on line $x\,x$, Fig. 1. Fig. 3 is a detailed view of one-half of the connecting-tubes (broken off at its ends) shown in Fig. 1, and marked A B. Fig. 4 is a vertical transverse section on line $y\,y$, Fig. 1. Fig. 5 is a detached perspective view of the two halves of the pipe B slightly separated.

Similar letters refer to similar parts throughout the several views.

The movable couplings C slip loosely on the ends of pipes P of the main conduit. They are provided with inwardly-projecting flanges C', having slots $c$ at proper points to allow passing over corresponding lugs $p$, projecting laterally from the ends of the pipe, whereby a bayonet-joint is formed upon these parts. The coupling is turned slightly around and held by lug on end of pipe. In a similar way a movable coupling C is placed on end of another pipe P. The two couplings have a thread on the upper end of their free ends, and after bringing ends of two main pipes together and completing all desired connections with conductors and placing in connecting-tubes, the connecting-band D is screwed on the two couplings C and the connection completed at one interval between ends of main pipes, conductors all in, and conduit ready for use as far in its length as this present-described coupling-connection.

It is fully intended that the foregoing description of the operation of connecting the sections of the conduit and the conductors contained in it should be for the information of parties wishing to lay it down; but the principal end sought to be gained by the coupling-connction is the ease with which it can all be disconnected at any time, outside connections made, and the conduit restored at once to its first condition. The pipes of the conduit once laid and in running order, when it is desired to have access to their interior, the band D can be easily removed and the whole coupling arrangement can be moved back out of the way clear of the ends of each section of the main stem, thereby allowing plenty of working room to get to any desired conductor, and after finishing work at once close up all outside interference with interior.

The connecting-tubes B B (shown in longitudinal section in Fig. 1) are placed as shown to insulate currents of high tension for electric light and motors from currents intended for telegraph and telephone, as the conduit is devised for all kinds of electrical currents. They simply continue the insulation across the interval between the ends of the pipe or stem P. They are intended to be equal in number to the needs of the conduit. They are adjustable and independent separately. They have no connection with any conductor but the one passing through them. From the hole F in the pipe they comprise a lower half A, resting in the enlarged ends ƒ of said holes F, and an upper half A', slightly shorter than said lower half and adapted to clear the ends of the pipes P, whereby they are designed to be and can be removed at will and lateral connections made with them. To get at the conductor passing through any one of them, lift off top half A', which is slightly shorter than under half A, and which is tongued at a' to fit a groove a" in the under half A, make connection through lateral openings in tube B and through openings E in circumference of movable couplings, replace the upper half A' upon the lower half A, secure in place, if desired, by any suitable means, and replace the band D to effect complete the insulation as at first maintained.

I am aware that prior to my invention terra-cotta or other burned or baked clay conduits have been used for putting electric conductors under ground. I therefore do not claim the use of such material; but What I do claim, and wish to secure by Letters Patent, is—

1. In an electrical conduit, the pipes P, having laterally-projecting lugs p, in combination with the couplings C, having slots c, adapted to register with said lugs, said couplings having an exterior screw-thread upon their free ends, and the ring D having an interior screw-thread adapted to connect said couplings, substantially as and for the purpose described.

2. In an electrical conduit, the pipe P and the coupling C, removably connected to the end of said pipe, said coupling having laterally-projecting openings E, as and for the purpose set forth.

3. In an electrical conduit, the pipes P P', having the longitudinal holes F, with enlarged ends ƒ, in combination with the tubes A, having lateral branches B, and with the coupling C, having lateral openings E, registering with said lateral branches B in the tubes A, substantially as described.

4. In an electrical conduit, the pipes P P', having the longitudinal holes F, with enlarged ends ƒ, in combination with a coupling for connecting the ends of said pipes and holding them at a distance from each other, and with independent tubes removably connecting said holes F and spanning the space within said coupling, substantially as described.

5. In an electrical conduit, the pipes P P', having the longitudinal holes F, with enlarged ends ƒ, in combination with a coupling for connecting the ends of said pipes and holding them at a distance from each other, and with independent tubes removably connecting said holes F and spanning the space within said coupling, said tubes comprising a lower portion A, adapted to rest in and be supported upon said enlarged ends ƒ, and an upper portion A' shorter than said lower portion, said portions being provided with tongue-and-groove connection, whereby they will be held together when in their normal positions, substantially as described.

6. In an electrical conduit, the independent tube B herein described, the same comprising a lower half A and an upper half A', both provided with tongue-and-groove devices, whereby they will be held together when in their normal positions, and each carrying half of a lateral projection B, for the purpose set forth, the lower half being longer than the upper half, the whole operating as and for the purposes hereinbefore specified.

CHAS. C. DASHIELL.

Witnesses:
A. L. COLLAMER,
H. E. GUEST.